(12) United States Patent
Kini et al.

(10) Patent No.: US 8,284,678 B2
(45) Date of Patent: *Oct. 9, 2012

(54) SCALABLE CONNECTIVITY FAULT MANAGEMENT IN A BRIDGED/VIRTUAL PRIVATE LAN SERVICE ENVIRONMENT

(75) Inventors: Sriganesh Kini, San Jose, CA (US); Rishi Mehta, San Jose, CA (US)

(73) Assignee: Ericsson AB, Stockholm (SE)

( * ) Notice: Subject to any disclaimer, the term of this patent is extended or adjusted under 35 U.S.C. 154(b) by 582 days.

This patent is subject to a terminal disclaimer.

(21) Appl. No.: 12/050,121

(22) Filed: Mar. 17, 2008

(65) Prior Publication Data

US 2009/0109861 A1    Apr. 30, 2009

Related U.S. Application Data

(60) Provisional application No. 61/001,150, filed on Oct. 30, 2007.

(51) Int. Cl.
*G06F 11/00* (2006.01)

(52) U.S. Cl. ............ 370/241.1; 370/241; 370/242; 370/248; 370/231

(58) Field of Classification Search .......... 370/241.1, 370/241, 242, 248, 231
See application file for complete search history.

(56) References Cited

U.S. PATENT DOCUMENTS

| | | | |
|---|---|---|---|
| 7,240,364 | B1 | 7/2007 | Branscomb et al. |
| 2006/0159008 | A1 | 7/2006 | Sridhar et al. |
| 2007/0014290 | A1* | 1/2007 | Dec et al. ............ 370/390 |
| 2007/0025256 | A1 | 2/2007 | Hertoghs et al. |
| 2007/0140126 | A1* | 6/2007 | Osswald et al. ........ 370/236.2 |
| 2008/0040509 | A1 | 2/2008 | Werb et al. |
| 2008/0285466 | A1* | 11/2008 | Salam et al. ............ 370/241.1 |
| 2011/0116363 | A1* | 5/2011 | Elie-Dit-Cosaque et al. 370/216 |

OTHER PUBLICATIONS

PCT International Search Report and Written Opinion for PCT International Appln. No. PCT/US08/078984 mailed Dec. 12, 2008. (15 pages).
International Preliminary Report on Patentability, Application No. PCT/US2008/078984, dated May 4, 2010, 10 pages.
Non-Final Office Action, U.S. Appl. No. 12/050,118, dated Mar. 26, 2012, 18 pages.
Non-Final Office Action, U.S. Appl. No. 12/050,118, dated Mar. 2, 2010, 44 pages.
Final Office Action, U.S. Appl. No. 12/050,118, dated Jul. 22, 2010, 17 pages.
Notice of Allowance, U.S. Appl. No. 12/050,118, dated Jun. 6, 2012, 14 pages.

* cited by examiner

*Primary Examiner* — Huy D Vu
*Assistant Examiner* — Omer Mian
(74) *Attorney, Agent, or Firm* — Blakely Sokoloff Taylor & Zafman, LLP

(57) ABSTRACT

A method and apparatus that proxies connectivity check messages and sends fault state changes messages across an MPLS/VPLS network is described. A network element proxies connectivity check messages for remote maintenance endpoints based on a local database. The network element updates the database based on received fault state change message that identify a fault state change of a remote maintenance endpoint. The network element detects fault state changes of local maintenance endpoints and sends a fault state change message to other network elements that proxy connectivity check message for the local maintenance endpoints.

19 Claims, 6 Drawing Sheets

SCALABLE CONNECTIVITY FAULT MANAGEMENT IN A BRIDGED/VIRTUAL PRIVATE LAN SERVICE ENVIRONMENT

CROSS-REFERENCE TO RELATED APPLICATIONS

This application claims the benefit of U.S. provisional patent application No. 61/001,150, entitled "SCALABLE CONNECTIVITY FAULT MANAGEMENT IN A BRIDGED/VIRTUAL PRIVALE LAN SERVICE ENVIRONMENT", filed Oct. 30, 2007.

BACKGROUND

1. Field

Embodiments of the invention relate to the field of computer networking; and more specifically, supporting scalable connection fault management (CFM) in a bridged or virtual private local area network (LAN) service environment.

2. Background

Operation, Administration, and Maintenance (OAM) describes processes, activities, tools, standards, etc., involved with operating, administering, and maintaining computer networks. OAM is implemented for many different types of computer networks, such Ethernet, Internet Protocol (IP), multi-protocol label switching (MPLS), asynchronous transfer mode (ATM), virtual private LAN service (VPLS), etc. Each type of network will have a different type of OAM. For example, in an Ethernet network, 802.1ag Connectivity Fault Management (CFM) is used as an OAM management tool, and in a MPLS\VPLS network Virtual Circuit Connectivity Verification (VCCV) is used as an OAM tool. OAM tools are used, in part, to detect network connectivity faults, herein referred to as faults. A fault can be when a network device loses connectivity to the network. OAM tools detect a fault state change, such when a device becomes active on the network, by connecting to the network or becoming active on the network. Furthermore, a fault state change can be when a network loses connectivity to the network.

FIG. 1 illustrates one embodiment of network 100 CFM across a switched Ethernet and VPLS/MPLS environment. Network 100 is a heterogeneous network comprising two switched Ethernet networks 116A-B interconnected by a VPLS service provider network 106. In FIG. 1, Ethernet networks 116A-B are geographically dispersed. VPLS is a way to provide Ethernet based multipoint-to-multipoint communication over IP/MPLS networks. It allows geographically dispersed sites, such as Ethernet networks 116A-B to share an Ethernet broadcast domain by connecting sites through psuedowires. In VPLS, the LAN of each Ethernet network 116A-B is extended to edge of service provider network 106 and service provider network 106 emulates a switch or bridge to connect the customer LANs of Ethernet networks 116A-B to create a single bridged LAN. Coupling switched Ethernet networks 116A-B and VPLS network 106 at the edge of each network are network elements 104A-B. While in one embodiment, network elements 104A-B are edge routers, in alternative embodiments, network elements 104A-B are the same and/or different type of network element (switch, router, core router, etc.) For example, network element 104A couples switched Ethernet network 116A and VPLS network 106, while network element 104B couples switched Ethernet network 116B and VPLS network 106.

Each of switched Ethernet networks comprises maintenance endpoints (MEPs) coupled to the edge network elements. An MEPs is an actively managed CFM entity which can generate & receive CFM messages and track any responses such as personal computers, servers, bridges, switches, and other possible devices participating in Ethernet network. As illustrated in FIG. 1, Ethernet network 116A comprises maintenance endpoints 102A-C coupled to network element 104A and Ethernet network 116B comprises maintenance endpoints 102D-F coupled to network element 104B.

VPLS network 106 comprises network elements 108A-D, where network elements 108A and C couple to network element 104A and network elements 108B and D couple to network element 104B. Network elements 108A-B forward traffic between network elements 104A-B with pseudowire 110A. Network elements 108C-D forward traffic between network elements 104A-B with pseudowire 110B.

CFM is a standard that specifies protocols and protocol entities within virtual LAN (VLAN) aware bridges (such as network elements 104A-B) that provides capabilities for detecting, verifying, and isolating faults in VLANs. These capabilities can be used in networks operated by multiple independent organizations, each with restricted management access to each other's equipment. CFM defines a maintenance domain that as a network or part of the network for which faults in connectivity can be managed. Within each maintenance domain, there are several MEPs. An MEP is an actively managed CFM entity, which initiates, terminates, and reacts to CFM flows associated within a specific maintenance domain. Periodically, each MEP sends connectivity check messages to the other MEP in the maintenance domain. The connectivity check message is a multicast, unidirectional heartbeat that signals that the MEP sending the connectivity check message is up and coupled to the network. An MEP sending an initial connectivity check message signifies to other MEPs in the maintenance domain that the MEP has become active in this domain. Lack of connectivity check message from a particular MEP indicates to the other MEPs that the particular MEP is down or not participating in the domain.

In FIG. 1, MEPs 102A-C and D-F periodically send out connectivity check messages 112A-C and 114A-C, respectively. Each MEP can send out connectivity check messages every 3.3 milliseconds. These messages are multicast to all the other MEPs in the maintenance domain. Because the MEPs of the different Ethernet networks 116A-B belong to the same maintenance domain, the connectivity check messages are transmitted across VPLS network 106 via network elements 104 AB to the MEPs in different Ethernet networks 116 AB. In addition, because the connectivity check messages are multicast, network elements 104 AB broadcast these messages to each of the pseudowires coupled to the respective network element 104 AB in VPLS network 106.

Although CFM can provide an end-to-end fault management scheme for heterogeneous network 100, CFM is not scalable because of the flooding of the connectivity check (CC) messages by network elements 104A-B. As the number of MEPs in the maintenance domain increase, the amount of CC messages transmitted across VPLS network increases dramatically.

BRIEF SUMMARY

A method and apparatus that proxies connectivity check messages and sends fault state changes messages across an MPLS/VPLS network is described. A network element proxies connectivity check messages for remote maintenance endpoints based on a local database. The network element updates the database based on received fault state change message that identify a fault state change of a remote maintenance endpoint. The network element detects fault state changes of local maintenance endpoints and sends a fault state change message to other network elements that proxy connectivity check message for the local maintenance endpoints.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. However, element numbers are the same for those elements that are the same across different Figures. In the drawings.

DETAILED DESCRIPTION

Figure 1:
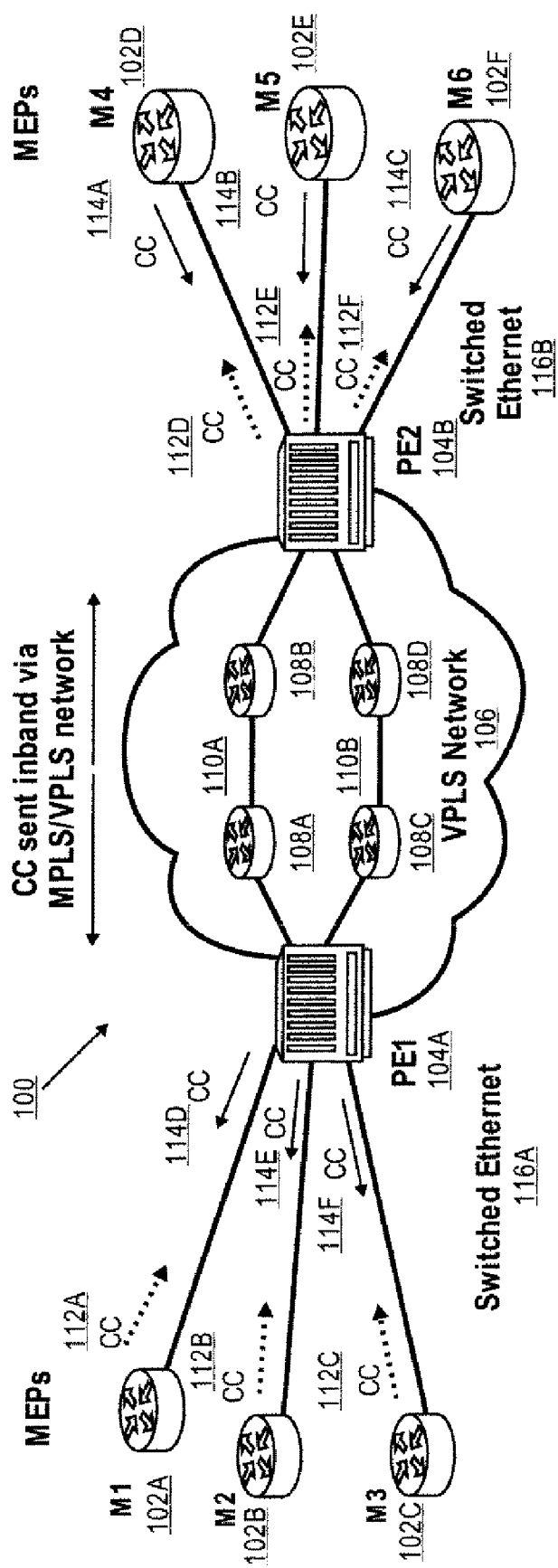
FIG. 1 (Prior Art) illustrates one embodiment of network supporting CFM across a switched Ethernet and VPLS/MPLS environment.

In the following description, numerous specific details such as network element, line card, fault, fault management, packet, maintenance endpoint, LAN, VPLS, MPLS and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other. Exemplary embodiments of the invention will now be described with reference to FIGS. 2-6. In particular, the operations of the flow diagrams in FIGS. 4 and 5 will be described with reference to the exemplary embodiments of FIGS. 2, 3 and 6. However, it should be understood that the operations of these flow diagrams can be performed by embodiments of the invention other than those discussed with reference to FIGS. 2, 3 and 6 and that the embodiments discussed with reference to FIGS. 2, 3 and 6 can perform operations different than those discussed with reference to these flow diagrams.

A method and apparatus for proxying connectivity check (CC) messages for remote MEPs and sending MEP fault state changes across an MPLS/VPLS network is described. According to one embodiment of the invention, a network element proxies connectivity check messages by periodically sending out connectivity check messages to MEPs in the local network of the network element. The network element transmits connectivity check messages for each of the active remote MEPs identified in a remote MEP database. The network element proxies the connectivity check message by creating the connectivity check message that mimics a message as if originated by one of the remote MEPs. According to another embodiment of the invention, the network element detects fault state changes of local MEP by the absence or appearance of connectivity check messages from local MEPs. The network element determines which local MEP had the fault state change and formats a VCCV message indicating the fault state change for that local MEP. The network element sends this VCCV message to other network elements that proxy connectivity check messages for remote MEPs.

Figure 2:
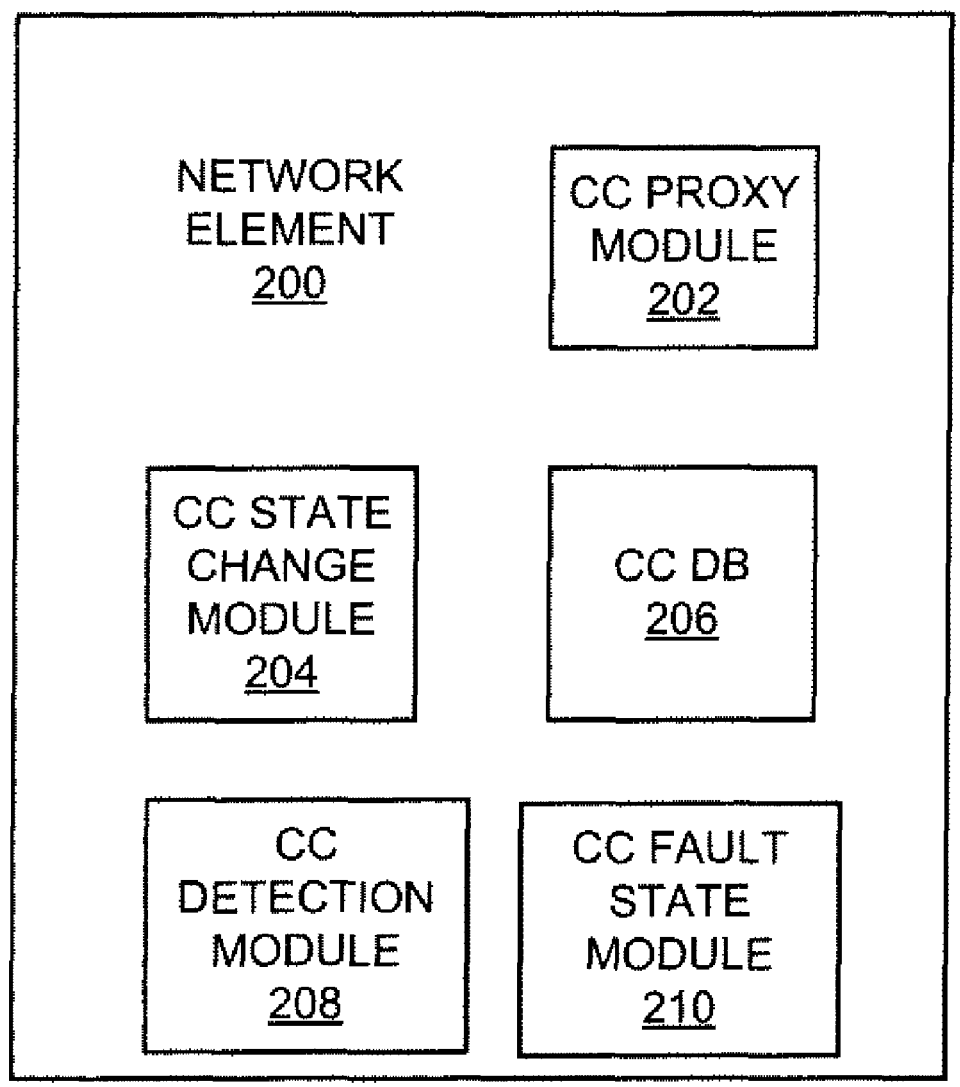
FIG. 2 is a block diagram of a network element that supports proxying connectivity check messages for remote MEPs and sending VCCV messages to other network elements based on MEP fault state changes according to one embodiment of the invention.

FIG. 2 is a block diagram of network element 200 that supports proxying connectivity check messages for remote MEPs and sending VCCV messages to other network elements based on MEP fault state changes according to one embodiment of the invention. A remote MEP is a MEP that reachable by traversing a VPLS network. A local MEP is part of the same Ethernet network as the proxying network element. For example and by way of illustration, in FIG. 1, MEPs 102A-C are remote to network element 104B and local to network element 104A. MEPs 102D-F are remote to network element 104A and local to network element 104B.

In FIG. 2, network element 200 comprises connectivity check proxy module 202, connectivity check state change module 204, connectivity check database 206, connectivity check module 208, and connectivity check fault state change module 210. Connectivity check proxy module 202 proxies connectivity check messages for remote MEPs by periodically transmitting connectivity check message representing remote MEPs to MEPs local to network element 200. For example and by way of illustration, network element 104A transmits connectivity check messages 114D-F representing MEPs 102D-F to MEPs 102A-C. In one embodiment, each of the connectivity check message transmitted is formatted to appear as if the connectivity check message originated from one of the active remote MEPs. In one embodiment, each of the proxied connectivity check message comprises the MAC address of an active remote MEP and an identifier called MEPID that uniquely identifies the MEP. In one embodiment, connectivity check module 202 transmits a connectivity check message for each active remote MEP up to every 3.3 milliseconds.

Figure 3:
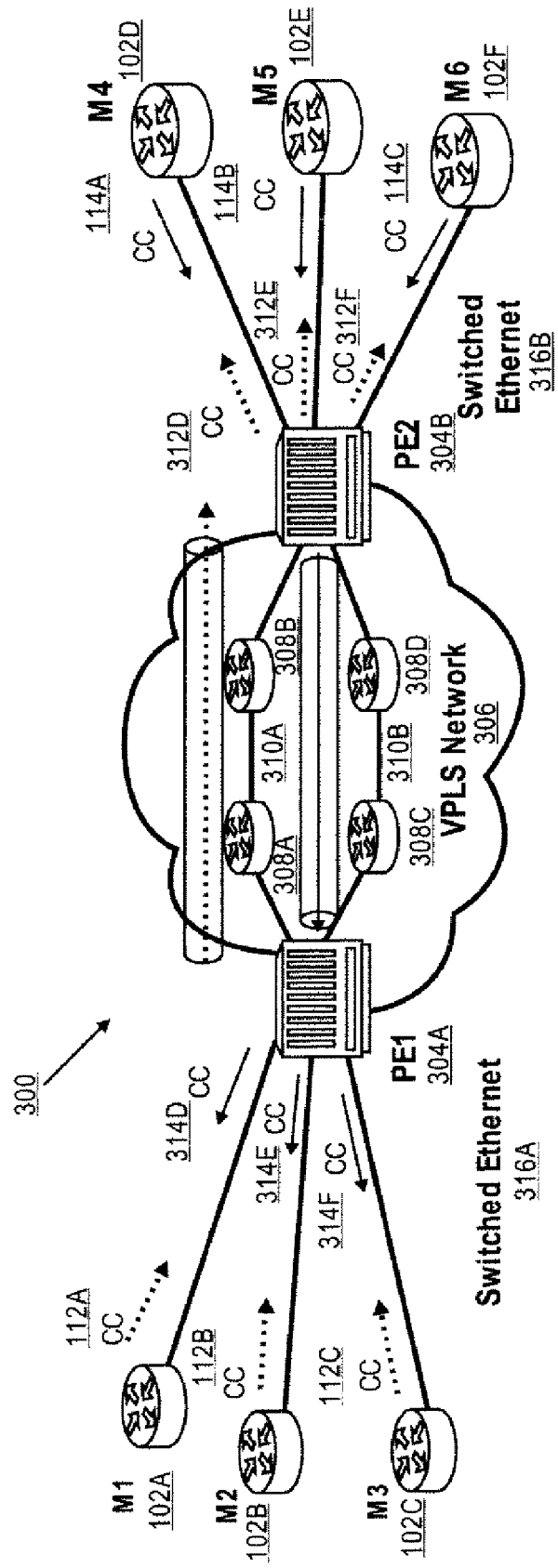
FIG. 3 is illustrates one embodiment of a network supporting scalable CFM across a switched Ethernet and VPLS/MPLS environment according to one embodiment of the invention.

Examples of the modules of network element 200 will be made with reference to FIG. 3. FIG. 3 is illustrates one embodiment of a network 300 supporting scalable CFM across a switched Ethernet and VPLS/MPLS environment according to one embodiment of the invention. FIG. 3 is similar to FIG. 1, in that MEPs 102A-C and D-F are sending to connectivity messages 112A-C and 114A-C, respectively. However, network elements 304A-B do not forward these messages to across VPLS network 306 as in FIG. 1 as will be described below. Furthermore, in FIG. 3, network elements 304A-B couple MEPs 102A-C and 102D-F, respectively, to service provider VPLS network 306. VPLS network 306 further comprises network elements 308A-D and pseudowires 310A-B. In addition, VCCV messages 318A-B are being transmitted and received by network elements 304A-B using pseudowires 310A-B.

In FIG. 3, instead of forwarding connectivity check messages 112A-C and 114A-C, network elements 304A-B proxy these connectivity check messages. In one embodiment, connectivity check proxy module 202 of network elements 304A-B transmits connectivity check messages 314D-F and 312D-F, respectively, to MEPs local to these network elements. In this embodiment, MEPs 102A-C are local to network element 304A and MEPs 102D-F are local to network element 304B. In one embodiment, network elements 304A-B do not need to forward connectivity check messages 112A-C and 114A-C across VPLS network 306 because network elements 304A-B are proxying these messages. Thus, the traffic for end-to-end fault management is greatly reduced because connectivity fault state change messages are transmitted across VPLS network 306 instead of the connectivity messages constantly transmitted by MEPs 112A-C and 114A-C.

Returning to FIG. 2, in one embodiment, network element determines which remote MEPs are active with connectivity state change module 204. In one embodiment, network element 200 receives a fault state change message from another network element that indicates that a remote MEP has had a fault state change. In one embodiment, connectivity check state change module 204 determines a remote MEP fault state change by receiving a VCCV message indicating a remote MEP fault state change. VCCV is a control channel between a pseudowire's ingress and egress points over which connectivity verification messages can be sent. VCCV messages can traverse the network in-band with the pseudowire's data or out-of-band. VCCV message are not forwarded past network elements on the edge of the MPLS/VPLS network. Thus, connectivity proxy module 202 proxies fault information of one protocol (e.g., CFM) based on receiving fault state updates on another protocol (e.g., VCCV).

In reference to FIG. 3, network element 304A determines which of remote MEPs 102D-F are active by receiving messages indicating fault state changes of MEPs in Ethernet network 316B. In one embodiment, network element 304A of network elements receives and processes the fault state change messages. In this embodiment, network element 304B transmits fault state change messages regarding MEPs 102D-F to network element 304A across VPLS network 306. In one embodiment, network element 304B transmits these messages as VCCV messages 318B over pseudowire 310B as described in reference with FIG. 2, block 204.

Returning to FIG. 2, connectivity check detection module 208 detects whether fault state change associated with a local MEP. In this embodiment, connectivity check module 208 detects the fault state change by receiving a connectivity check message from a newly active MEP or the lack of a connectivity check message from an active MEP. In one embodiment, connectivity check fault state change module 210 formats a message indicating the fault state change and transmits it to other network elements that are proxying the connectivity check messages While in one embodiment, this is a VCCV message carried over the pseudowire between the network elements, in alternate embodiments, other signaling mechanisms in the art can be used. The other network elements use this message to update their remote MEP database and to proxy connectivity check messages to the MEP local to that network element. By sending fault state changes and proxying connectivity check messages, network element 200 provides that end-to-end fault management for MEP without flooding the service provider network interconnecting the two Ethernet networks with constant connectivity checks messages. Furthermore, by detecting local fault state changes of MEP and transmitting these changes to other network elements proxying connectivity check messages, the other network element can automatically build connectivity check databases of remote MEPs.

In reference to FIG. 3, network element 304A detects fault state changes in local MEPs 102A-C and transmits faults state change messages to network elements 306B. In this embodiment, network element 304A detects the fault state changes and transmits the appropriate messages as described in reference with FIG. 2.

Returning to FIG. 2, in one embodiment, connectivity check proxy module 202 transmits the connectivity check messages based on the active MEPs identified in the connectivity check database 206. While in one embodiment, the connectivity check database 206 comprises local and remote MEPs and stores the connectivity status of each MEP in the database, in alternative embodiments, connectivity check database 206 comprise the same and/or different information (e.g., different combinations of active MEPs, local MEPs, remote MEPs, status of MEPs, etc.).

Figure 4:
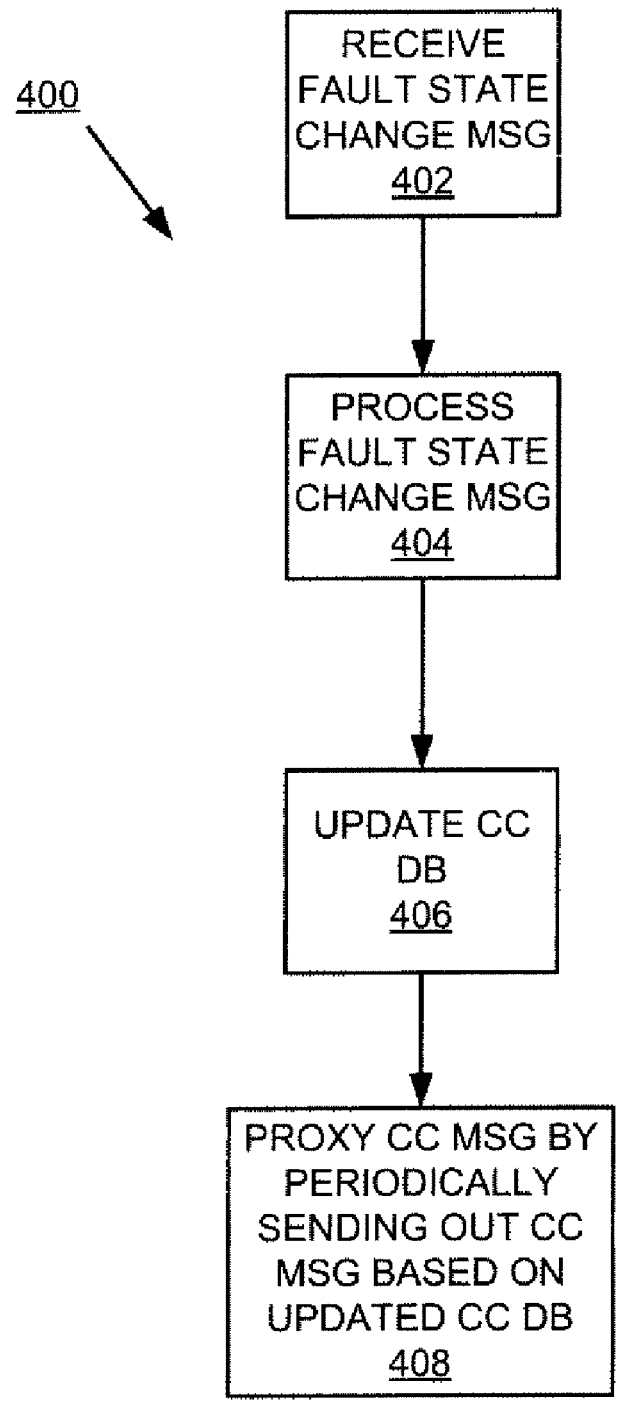
FIG. 4 is an exemplary flow diagram for proxying CC messages for remote MEPs according to one embodiment of the invention.

FIG. 4 is an exemplary flow diagram of a method 400 for proxying connectivity check messages for remote MEPs according to one embodiment of the invention. In one embodiment, network element 200 performs method 400 to proxy connectivity check messages. In FIG. 4, at block 402, method 400 receives fault state change messages, indicating a fault state change of a remote MEP. In one embodiment, method 400 receives a VCCV message that indicates the fault state change.

At block 404, method 400 processes the received fault state change message. In one embodiment, method 400 extracts the information from the fault state change message regarding the remote MEP that triggered the fault state change. While in one embodiment, method 400 extracts the MAC address of the remote MEP and whether the remote MEP became active or lost connectivity, in alternate embodiments, method 400 extracts other information such as MEPID, MAC-address, CC-interval, RDI (remote defect indicator) bit.

Method 400 uses the processed information from block 404 to update the connectivity check database at block 406. While in one embodiment, method 400 adds a new entry in the connectivity check database 206 for a remote MEP that becomes active, in alternate embodiments, method 400 can take some other action for a remote MEP that becomes active (update an existing remote MEP entry in connectivity check database 206 to indicate that MEP is active, etc.). In addition, method 400 updates the connectivity check database if the received fault state changes message indicates a remote MEP has lost connectivity. While in one embodiment, method 400 deletes the entry associated with the remote MEP that the message indicated had lost connectivity, in alternate embodiments, method 400 can take some other action (mark that remote MEP as lost connectivity, etc.

At block 408, method 400 proxies the connectivity check messages by periodically transmitting connectivity check messages to local MEPs based on the updated connectivity check database. In one embodiment, method 400 transmits a connectivity check message for each active remote MEP as indicated in the connectivity check database 206 as described in reference to connectivity check proxy module 202 in FIG. 2 and/or network elements 304A-B in FIG. 3.

Figure 5:
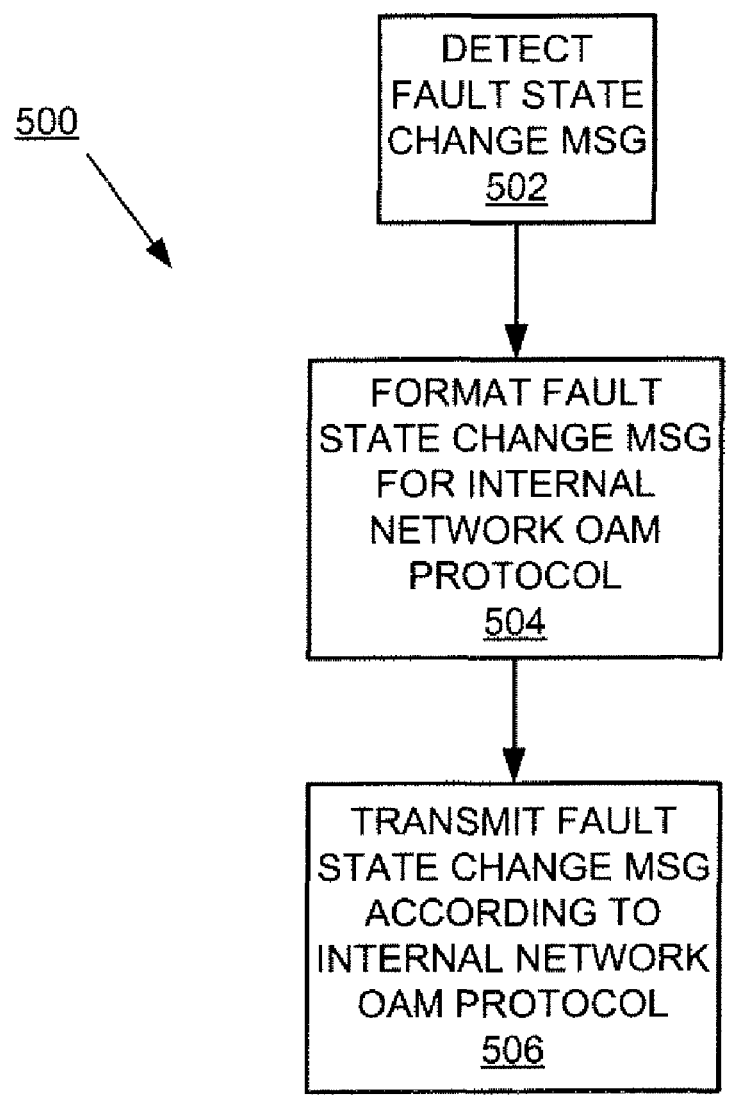
FIG. 5 is an exemplary flow diagram for sending VCCV messages to other network elements based on MEP fault state changes according to one embodiment of the invention.

FIG. 5 is an exemplary flow diagram of a method 500 for sending VCCV messages to other network elements based on MEP fault state changes according to one embodiment of the invention. In one embodiment, network element 200 performs method 500 to send VCCV messages to other network element based on MEP fault state changes. In FIG. 5, at block 502, method 500 detects a fault state change from one of the local MEPs.

At block 504, method 500 formats a fault state change message for the service provider network interconnecting two geographically disperse Ethernet networks. In one embodiment, method 500 formats a fault state change message as a VCCV message sent over one or more of the pseudowires of VPLS network 306. Alternatively, method 500 could format the fault state change message to another suitable OAM protocol for a VPLS network or other type of network interconnecting networks where the MEPs are coupled. In one embodiment, method 500 stores the information about the fault change (source MAC, MEP active, MEP not connected, etc.) in fields of the VCCV message. For example and by way of illustration, a VCCV payload can indicate a message formatted in a way to accommodate multiple CC messages, by using optional and/or custom fields of the VCCV payload. In this way, method 500 transforms fault detection of one protocol (CFM) and carries this information over another protocol (VCCV, etc.).

At block 506, method 500 transmits the formatted fault state message according to the OAM protocol of the service provider network. While in one embodiment, method 500 transmits the fault state change message according to the VCCV protocol (either in-band or out of band), in alternate embodiments, method 500 transmits the fault state change message according to some other protocol appropriate to the service provider network.

Figure 6:
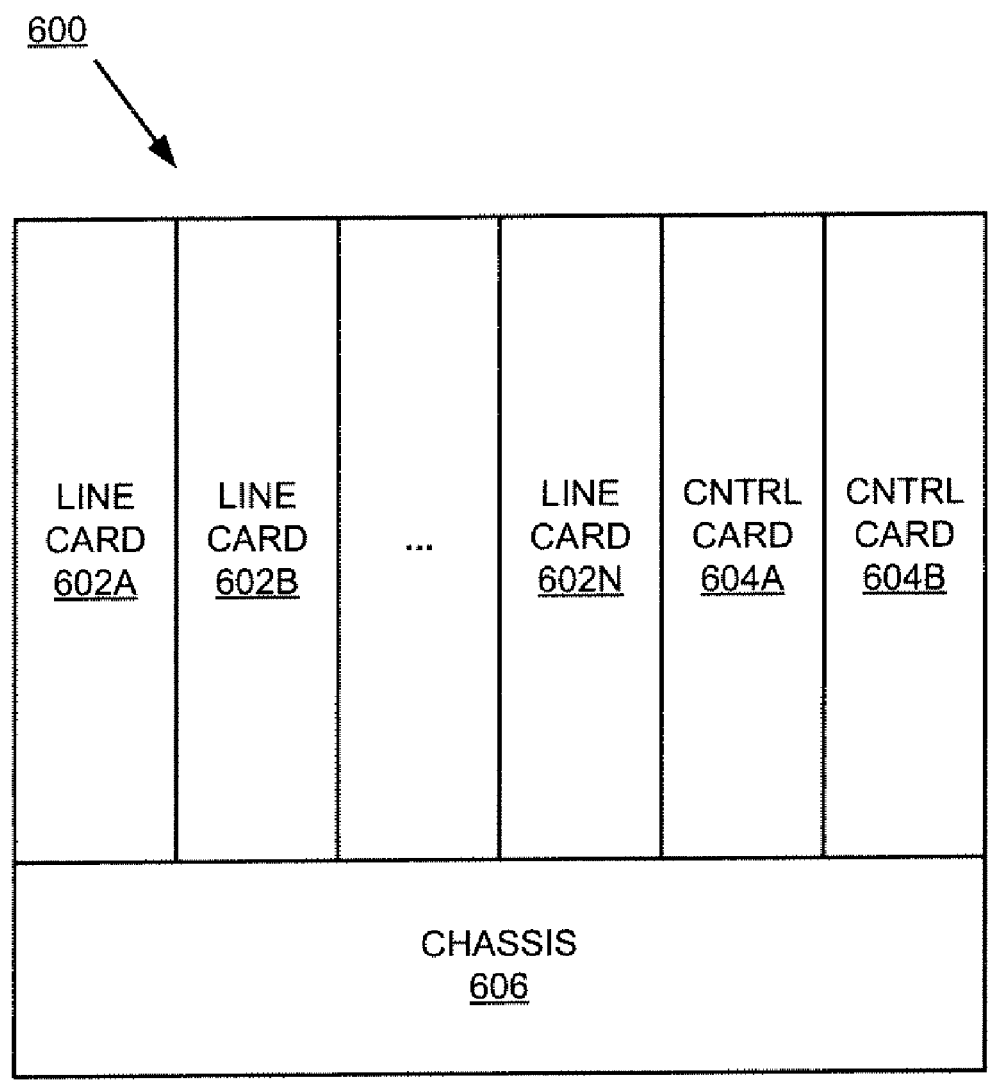
FIG. 6 is a block diagram illustrating an exemplary network element that handles proxying CC messages and sending VCCV messages according to one embodiment of the system.

FIG. 6 is a block diagram illustrating an exemplary network element 600 that handles proxying connectivity check messages and sending VCCV messages according to one embodiment of the system. In FIG. 6, backplane 606 couples to line cards 602A-N and controller cards 604A-B. While in one embodiment, controller cards 604A-B control the processing of the traffic by line cards 602A-N, in alternate embodiments, controller cards 604A-B perform the same and/or different functions (reprogram the line cards, upgrade software, handle operator requests, collect statistics, etc.). Line cards 602A-N process and forward traffic according to the policies received from controller cards 604A-B. In one embodiment, line cards 602A-N proxy connectivity check messages and transmit fault state change messages as described in FIGS. 2-5.

This implementation of the proxy connectivity check messages and transmit fault state change messages is an example, and not by way of limitation. Thus, network elements having other architectural configurations can incorporate embodiments of the invention. Examples of other network elements that could incorporate embodiments of the invention could have multiple line cards or have a single line card. Moreover, a network element having proxy connectivity check messages and transmit fault state change messages distributed across the traffic cards could incorporate embodiments of the invention.

Controller cards 604A-B as well as line cards 602A-N included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; etc.

Alternative Embodiments

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computerized method performed by a first network element, the method comprising:
   detecting, with the first network element according to a first protocol, a fault state change of a local maintenance endpoint, wherein a connectivity status of the local maintenance endpoint is active in response to the first network element periodically receiving connectivity check messages of the first protocol generated by the local maintenance endpoint, and is not active in response to a lack of connectivity check messages received from the local maintenance endpoint, and wherein detecting the fault state change includes detecting the connectivity status of the local maintenance endpoint changing between not active and active;
   creating a fault state change message according to a second protocol based on the detected fault state change; and
   sending the fault state change message according to the second protocol to a second network element that proxies connectivity check messages of the first protocol to remote maintenance endpoints and maintains a database that represents the connectivity status of the local maintenance endpoint, wherein the first and second protocols are different, and wherein sending the fault state change message includes sending the fault state change message in response to the connectivity status of the local maintenance end point changing from not active to active instead of forwarding the connectivity check messages periodically received by the first network element to the remote maintenance endpoints
   wherein the first network element and the second network element are included in the same domain.

2. The method of claim 1, wherein the first protocol is Connectivity Fault Management protocol.

3. The method of claim 1, wherein the second protocol is Virtual Circuit Connectivity Verification protocol.

4. The method of claim 1, wherein information about the fault state change is stored in fields of a Virtual Circuit Connectivity Verification (VCCV) message.

5. The method of claim 1, wherein a maintenance endpoint is one of a personal computer, a server, a bridge, and a switch.

6. A non-transitory machine-readable medium that stores instructions, which when executed by a set of one or more processors, cause said set of processors to perform operations comprising:
- detect, with a first network element according to a first protocol, a fault state change of a local maintenance endpoint, wherein a connectivity status of the local maintenance endpoint is active in response to the first network element periodically receiving connectivity check messages of the first protocol generated by the local maintenance endpoint, and is not active in response to a lack of connectivity check messages received from the local maintenance endpoint, and wherein detecting the fault state change includes detecting the connectivity status of the local maintenance endpoint changing between not active and active;
- create a fault state change message according to a second protocol based on the detected fault state change; and
- send the fault state change message according to the second protocol to a second network element that proxies connectivity check messages of the first protocol to remote maintenance endpoints and maintains a database that represents connectivity status of the local maintenance endpoint, wherein the first and second protocols are different, and wherein sending the fault state change message includes sending the fault state change message in response to the connectivity status of the local maintenance endpoint changing from not active to active instead of forwarding the connectivity check messages periodically received by the first network element to the remote maintenance endpoints
- wherein the first network element and the second network element are included in the same domain.

7. The machine-readable medium of claim 6, wherein the first protocol is Connectivity Fault Management protocol.

8. The machine-readable medium of claim 6, wherein the second protocol is Virtual Circuit Connectivity Verification protocol.

9. The machine-readable medium of claim 6, wherein information about the fault state change is stored in fields of a Virtual Circuit Connectivity Verification (VCCV) message.

10. The machine-readable medium of claim 6, wherein a maintenance endpoint is one of a personal computer, a server, a bridge, and a switch.

11. An apparatus comprising: a first network element to be coupled with a second network element that proxies connectivity check messages to remote maintenance endpoints, the first network element further to be coupled with a set of one or more third network elements, the first network element including: a connectivity check detection module to detect, according to a first protocol, a fault state change of a local maintenance endpoint on the set of third network elements wherein a connectivity status of the local maintenance endpoint is active in response to the first network element periodically receiving connectivity check messages of the first protocol generated by the local maintenance endpoint, and is not active in response to a lack of connectivity check messages received from the local maintenance endpoint, and wherein detecting the fault state change includes detecting the connectivity status of the local maintenance endpoint changing between not active and active; and
- a connectivity check fault state change module to create a fault state change message according to a second protocol based on the detected fault state change and send the fault state change message according to the second protocol to the second network element, and wherein sending the fault state change message includes sending the fault state change message in response to the connectivity status of the local maintenance endpoint changing from not active to active instead of forwarding the connectivity check messages periodically received by the first network element to the remote maintenance endpoints
- wherein the first network element and the second network element are included in the same domain.

12. The apparatus of claim 11, wherein the first protocol is Connectivity Fault Management protocol.

13. The apparatus of claim 11, wherein the second protocol is Virtual Circuit Connectivity Verification protocol.

14. The apparatus of claim 11, wherein information about the fault state change is stored in fields of a VCCV message.

15. The apparatus of claim 11, wherein a maintenance endpoint is one of a personal computer, a server, a bridge, and a switch.

16. A network element comprising:
- a controller card that controls functions of the network element;
- a set of one or more line cards, wherein at least one of the line cards configured to detect, according to a first protocol, a fault state change of a local maintenance endpoint, wherein a connectivity status of the local maintenance endpoint is active in response to the line card periodically receiving connectivity check messages of the first protocol generated by the local maintenance endpoint, and is not active in response to a lack of connectivity check messages received from the local maintenance endpoint, and wherein detecting the fault state change includes detecting the connectivity status of the local maintenance endpoint changing between not active and active;
- create a fault state change message according to a second protocol based on the detected fault state change, and
- send the fault state change message according to the second protocol to a second network element that proxies messages of the first protocol to remote maintenance endpoints and maintains a database that represents connectivity status of the local maintenance endpoint, wherein the first and second protocols are different, and wherein sending the fault state change message includes sending the fault state change message in response to the connectivity status of the local maintenance endpoint changing from not active to active instead of forwarding the connectivity check messages periodically received by the line card to the remote maintenance endpoints
- wherein the first network element and the second network element are included in the same domain.

17. The network element of claim 16, wherein the first protocol is Connectivity Fault Management protocol.

18. The network element of claim 16, wherein the second protocol is Virtual Circuit Connectivity Verification protocol.

19. The network element of claim 16, wherein information about the fault state change is stored in fields of a Virtual Circuit Connectivity Verification (VCCV) message.

* * * * *

UNITED STATES PATENT AND TRADEMARK OFFICE
CERTIFICATE OF CORRECTION

PATENT NO. : 8,284,678 B2  Page 1 of 1
APPLICATION NO. : 12/050121
DATED : October 9, 2012
INVENTOR(S) : Kini et al.

It is certified that error appears in the above-identified patent and that said Letters Patent is hereby corrected as shown below:

IN THE SPECIFICATIONS:

In Column 1, Line 32, delete "MPLSIVPLS" and insert -- MPLS/VPLS --, therefor.

In Column 6, Line 4, delete "messages" and insert -- messages. --, therefor.

IN THE CLAIMS:

In Column 8, Line 63, in Claim 1, delete "endpoints" and insert -- endpoints, --, therefor.

In Column 9, Line 38, in Claim 6, delete "endpoints" and insert -- endpoints, --, therefor.

In Column 10, Lines 13-14, in Claim 11, delete "endpoints" and insert -- endpoints, --, therefor.

In Column 10, Line 55, in Claim 16, delete "endpoints" and insert -- endpoints, --, therefor.

Signed and Sealed this
Fifth Day of March, 2013

Teresa Stanek Rea
*Acting Director of the United States Patent and Trademark Office*